United States Patent
Legakis et al.

(10) Patent No.: US 8,169,437 B1
(45) Date of Patent: May 1, 2012

(54) DISTRIBUTED TESSELLATION TOPOLOGY GENERATOR

(75) Inventors: Justin S. Legakis, Sunnyvale, CA (US); Subodh Kumar, New Delhi (IN)

(73) Assignee: NVIDIA Corporation, Santa Clara, CA (US)

( * ) Notice: Subject to any disclaimer, the term of this patent is extended or adjusted under 35 U.S.C. 154(b) by 911 days.

(21) Appl. No.: 12/170,383

(22) Filed: Jul. 9, 2008

(51) Int. Cl.
*G06T 15/30* (2011.01)
(52) U.S. Cl. .................. 345/423; 345/505; 345/428
(58) Field of Classification Search .......... 345/420, 345/423, 428, 505, 506, 582, 422; 382/154; 717/160
See application file for complete search history.

(56) References Cited

U.S. PATENT DOCUMENTS

| | | | | |
|---|---|---|---|---|
| 6,574,360 B1 * | 6/2003 | Berdardini et al. | .......... | 382/154 |
| 7,034,823 B2 * | 4/2006 | Dunnett | .......... | 345/422 |
| 7,532,213 B2 * | 5/2009 | Sfarti | .......... | 345/423 |
| 7,928,979 B2 * | 4/2011 | Patel et al. | .......... | 345/423 |
| 2004/0085313 A1 * | 5/2004 | Moreton et al. | .......... | 345/423 |
| 2004/0196285 A1 * | 10/2004 | Rice et al. | .......... | 345/423 |
| 2005/0024375 A1 * | 2/2005 | Horton et al. | .......... | 345/582 |
| 2007/0169059 A1 * | 7/2007 | Halambi et al. | .......... | 717/160 |
| 2008/0012853 A1 * | 1/2008 | Geiger | .......... | 345/420 |

* cited by examiner

*Primary Examiner* — Kee M Tung
*Assistant Examiner* — Weiming He
(74) *Attorney, Agent, or Firm* — Patterson & Sheridan, LLP

(57) ABSTRACT

A system and method for dividing three-dimensional patches into tasks for processing receives control points defining a three dimensional patch and determines if a number of vertices of the three dimensional patch is greater than a maximum value. When the number of vertices is not greater than the maximum value, the three dimensional patch is output as a single task. When the number of vertices is greater than the maximum value, the three dimensional patch is divided into multiple tasks that each include a number of vertices that is not greater than the maximum value and the multiple tasks are output.

20 Claims, 12 Drawing Sheets

DISTRIBUTED TESSELLATION TOPOLOGY GENERATOR

BACKGROUND OF THE INVENTION

1. Field of the Invention

The present invention generally relates to tessellation processing of patches in three-dimensional space to produce graphics primitives and more specifically to a system and method for generating portions of tessellated patch topology for processing.

2. Description of the Related Art

Surfaces in three-dimensional space are typically subdivided into patches that are defined by control points. The patches are then tessellated to produce graphics primitives that are processed (rendered) to produce an image. The number of vertices that are produced during tessellation varies depending on the level of tessellation. When a single processing unit is used to perform the tessellation, each input patch may produce any number of vertices. In order to increase the processing throughput it is desirable to distribute the processing workload across multiple execution units in order to perform the processing in parallel.

Accordingly, what is needed in the art is a system and method for generating portions of tessellated patches to compute vertex data for processing by multiple execution units.

SUMMARY OF THE INVENTION

A system and method for generating portions of tessellated patches to compute vertex data for processing by multiple execution units. The portions of tessellated patches or tasks are generated based on the patch topology. The tasks are then distributed to an array of execution units for processing in parallel to evaluate vertex attributes.

Various embodiments of a method of the invention for dividing three-dimensional patches into tasks for processing include receiving control points defining a three dimensional patch and determining if a number of vertices of the three dimensional patch is greater than a maximum value. When the number of vertices is not greater than the maximum value, the three dimensional patch is output as a single task. When the number of vertices is greater than the maximum value, the three dimensional patch is divided into multiple tasks that each include a number of vertices that is not greater than the maximum value and the multiple tasks are output.

Various embodiments of the invention include a system for dividing three-dimensional patches into tasks for processing. The system includes a task generator that is configured to receive control points defining a three dimensional patch and determine if a number of vertices of the three dimensional patch is greater than a maximum value. When the number of vertices is not greater than the maximum value, the three dimensional patch is output by the task generator as a single task. When the number of vertices is greater than the maximum value, the three dimensional patch is divided into multiple tasks that each include a number of vertices that is not greater than the maximum value and the multiple tasks are output by the task generator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
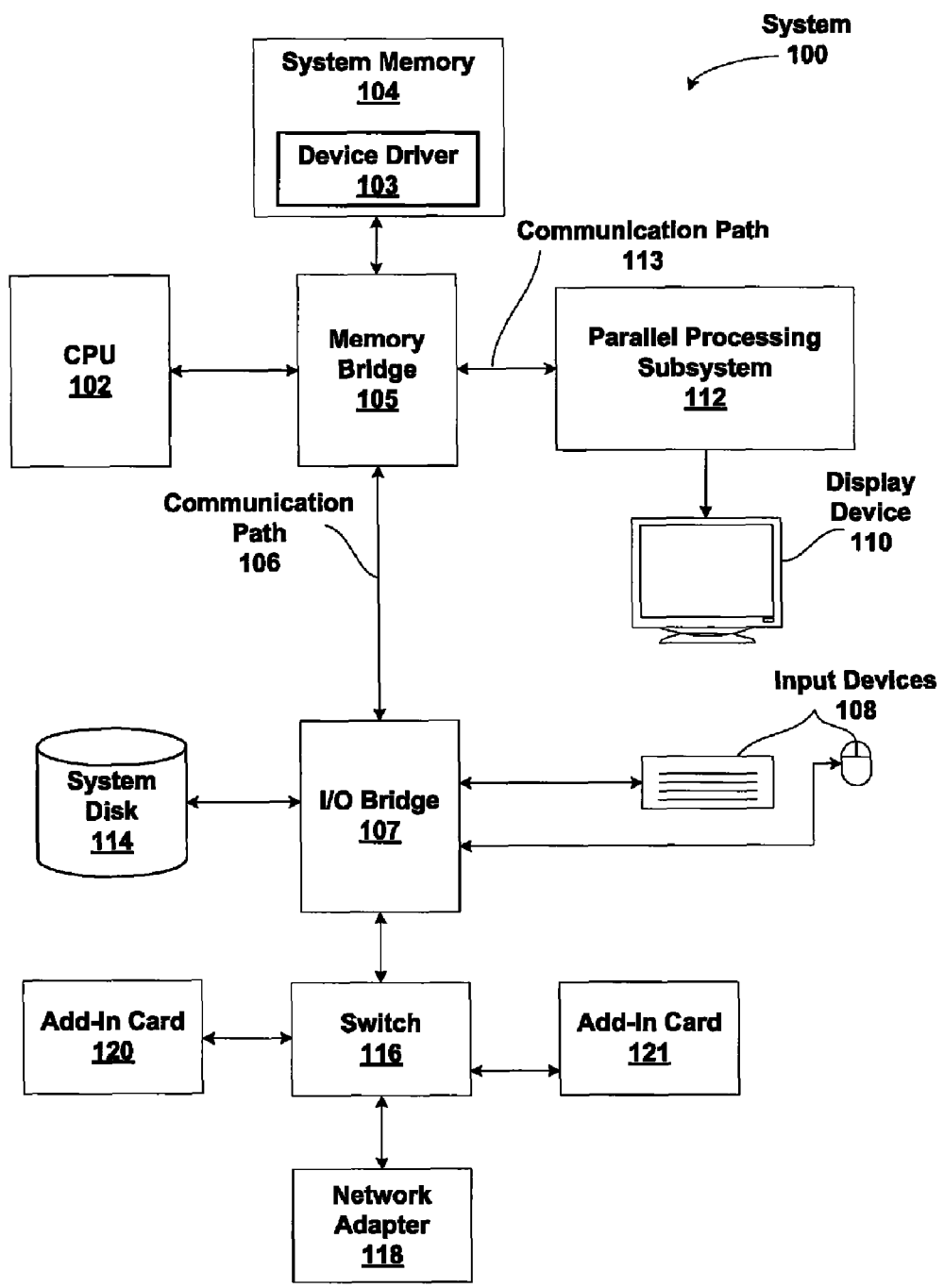
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
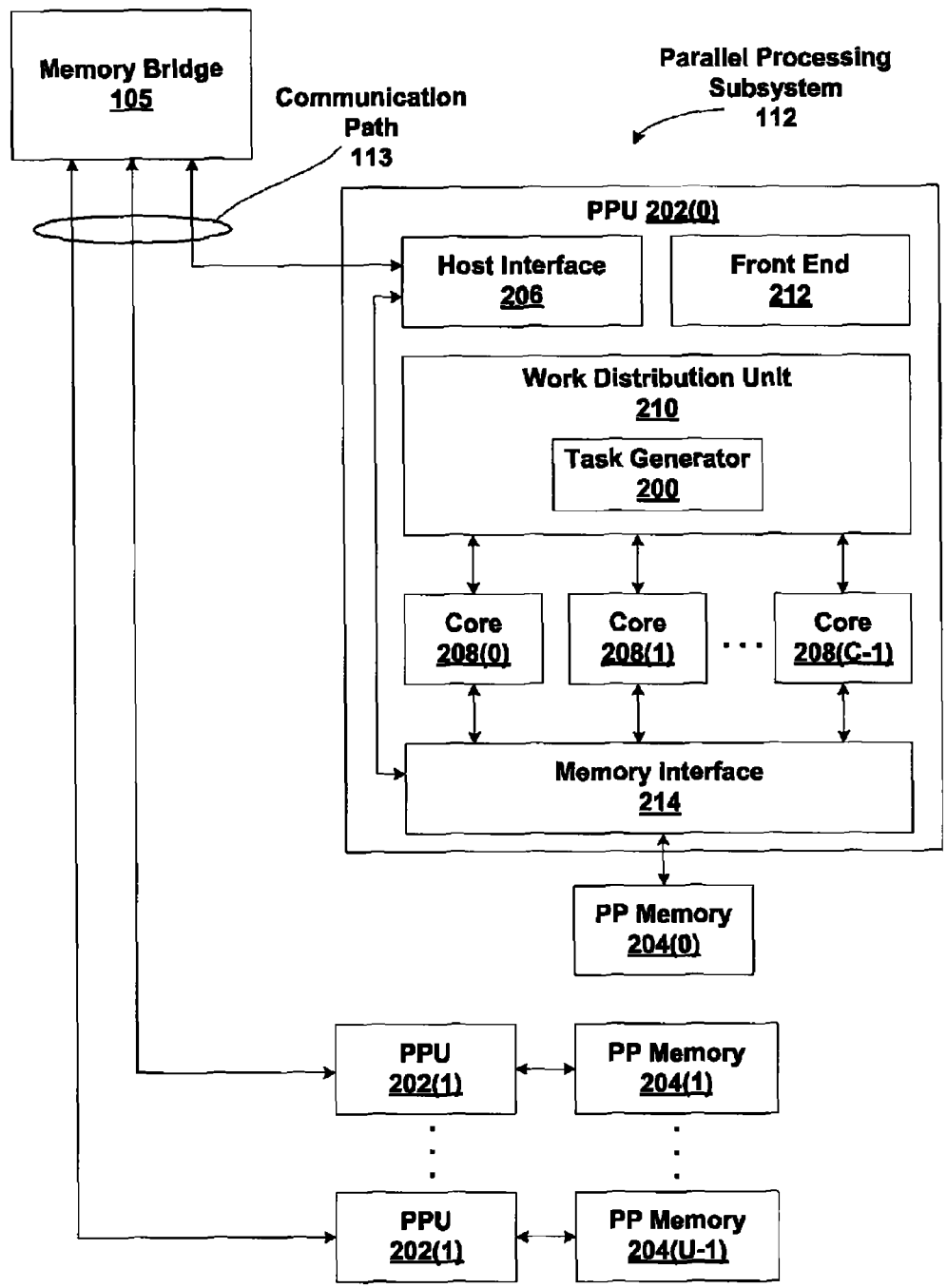
FIG. 2 is a block diagram of a parallel processing subsystem for the computer system of FIG. 1 in accordance with one or more aspects of the present invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 may be allocated for processing different types of programs or processing. For example, a first set of cores 208 may be allocated to perform tessellation operations, including vertex stitching to define primitive topologies. A second set of cores 208 may be allocated to perform tessellation shading to evaluate patch parameters for the primitive topology and determine vertex positions and other per-vertex attributes. The allocation of cores 208 may vary dependent on the workload for each type of program or processing.

Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208.

A task generator 200 within work distribution unit 210 receives a stream of patch data and tessellation information (tessellation level of detail values) and outputs portions of the patch data for processing. Each portion is called a task and each task may be independently processed by one of cores 208. Work distribution unit 210 distributes the tasks to cores 208 in order to process the tasks in parallel. The number of vertices produced by tessellating each patch is variable, depending on the tessellation level of detail, so a patch is divided into one or more tasks each having approximately equal processing requirements. The number of vertices in each patch can be determined using the tessellation levels of detail for each patch, before the vertex attributes are computed. Therefore, it is possible to generate the tasks and distribute the computation of vertex attributes. The method of dividing of a patch into tasks is described in detail in conjunction with FIGS. 6A, 6B, and 6C.

Dividing the processing workload for each patch into approximately equal sized tasks enables distribution of the processing to multiple cores 208. A single task generator 200 may be configured to produce tasks at a frequency capable of providing tasks to multiple cores 208 for processing. In conventional systems, the processing may be performed by a single processing engine while other processing engines are idle, waiting to begin processing of the geometry produced by tessellation. In addition to enabling the distribution of the workload, dividing the patch into tasks, each of a maximum size allows the amount of buffering needed to store the input tasks or vertices output as a result of processing the tasks to be limited. Reducing the amount of buffering circuitry is beneficial in terms of die size.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
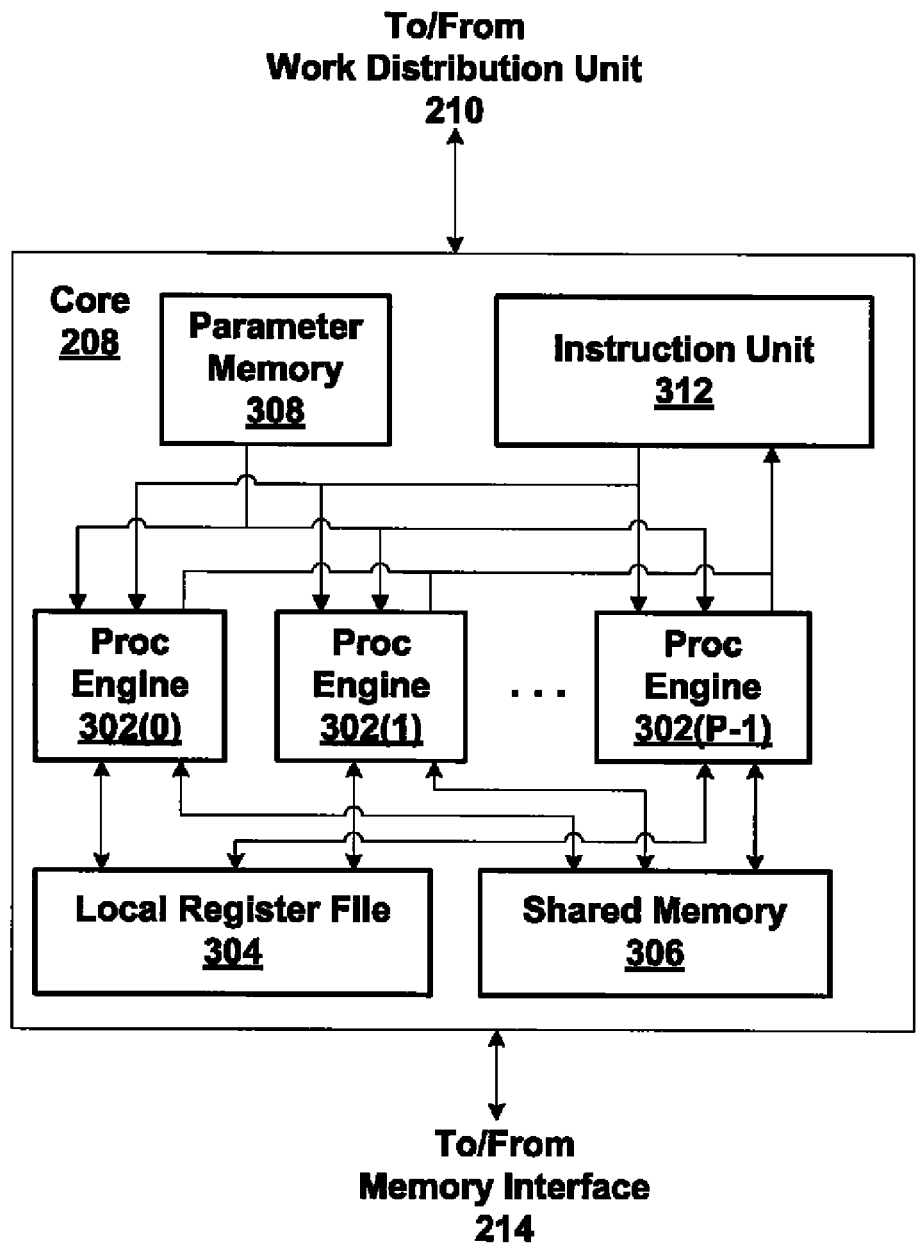
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In some embodiments, single-instruction, multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "warp" or "thread group." Additionally, a plurality of related thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of thread groups simultaneously active on the core 208. The size of a CTA is generally determined by the programmer and the amount of hardware resources, such as memory or registers, available to the CTA.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations. Parallel processing engines 302 may be configured to perform vertex stitching operations, as described in conjunction with FIGS. 6, 7A, and 7B. Alternatively, one or more dedicated vertex stitching units may be included within core 208 to perform the vertex stitching operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate synchronous parallel execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208 and may be used to transfer data between different threads. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants and per-vertex parameters) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in thread groups. As used herein, a "thread group" refers to a group of up to P threads of execution of the same program on different input data, with one thread of the group being assigned to each processing engine 302. A thread group may include fewer than P threads, in which case some of processing engines 302 will be idle during cycles when that thread group is being processed. A thread group may also include more than P threads, in which case processing will take place over consecutive clock cycles. Since each processing engine 302 can support up to G threads concurrently, it follows that up to G thread groups can be executing in core 208 at any given time.

On each clock cycle, one instruction is issued to all P threads making up a selected one of the G thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 may be synchronously executing the same instruction for different threads in the same thread group. Those skilled in the art will recognize that such synchronous parallel execution of each thread in a thread group is characteristic of a SIMD architecture. When the threads in a thread group are executing synchronously, processing engines 302 are configured to execute instructions in a SIMD manner. However, in some instances, some threads in a thread group may be temporarily idle, e.g., due to conditional or predicated instructions, divergence at branches in the program, or the like, as described further herein. Processing engines 302 may be configured to function as SIMD or SIMT engines.

Operation of core 208 is advantageously controlled via a core interface 303. In some embodiments, core interface 303 receives data to be processed, e.g., surface (patch) data, primitive data, vertex data, and/or pixel data, as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or thread group in instruction unit 312, then signals instruction unit 312 to begin executing the threads. When execution of a thread or thread group is completed, core 208 advantageously notifies core interface 303. Core interface 303 can then initiate other processes, e.g., to retrieve output data from shared memory 306 and/or to prepare core 208 for execution of additional threads or thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Graphics Pipeline Architecture

Figure 4:
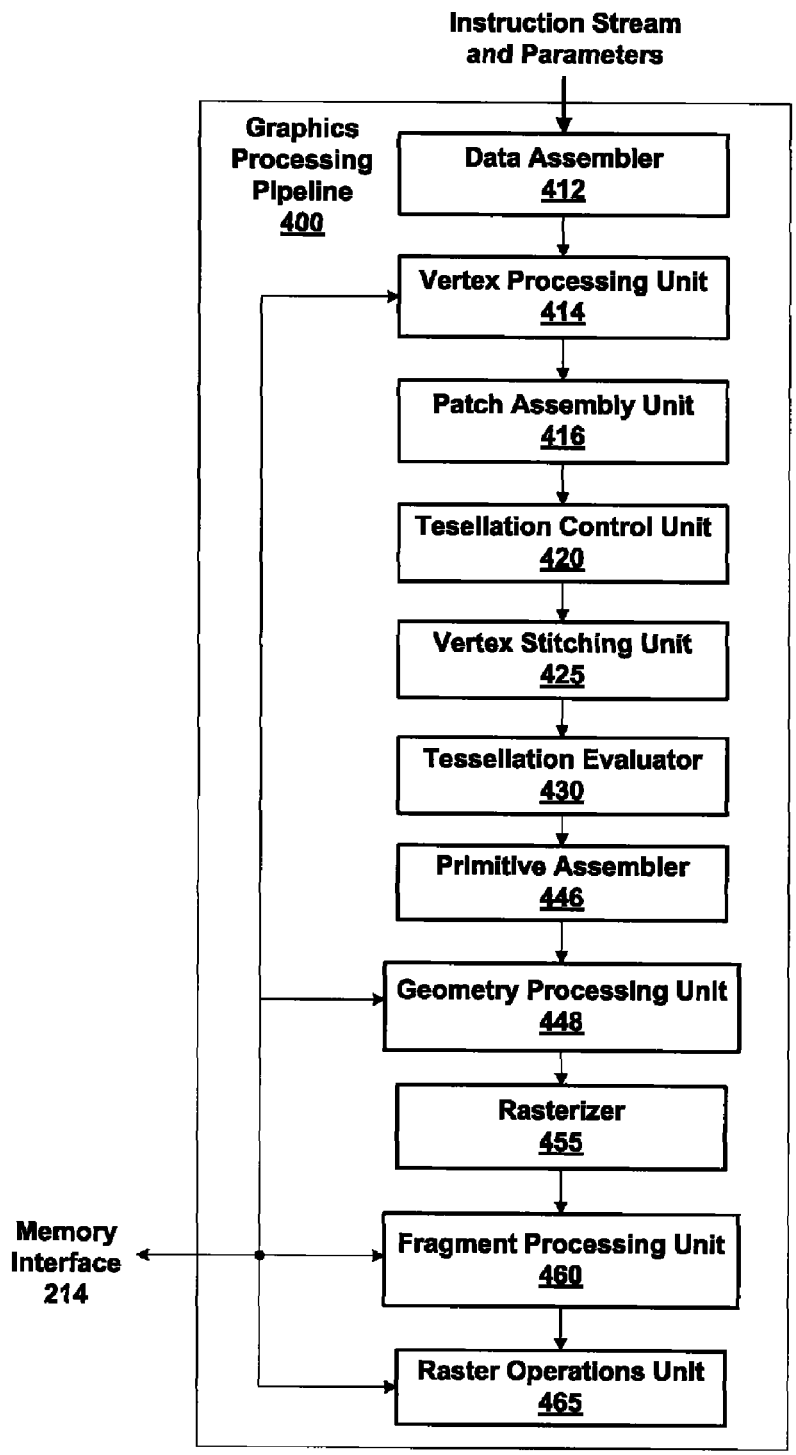
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example, core 208 may be configured to perform the functions of one or more of a vertex processing unit 414, a tessellation control unit 420, a tessellation evaluator 430, a geometry processing unit 448, and a fragment processing unit 460. The functions of data assembler 412, patch assembly unit 416, vertex stitching unit 425, primitive assembler 446, rasterizer 455, and raster operations unit 465 may also be performed by core 208. Alternately, graphics processing pipeline 400 may be implemented using dedicated processing units for one or more of vertex processing unit 414, tessellation control unit 420, tessellation evaluator 430, geometry processing unit 448, fragment processing unit 460, vertex stitching unit 425, patch assembly unit 416, primitive assembler 446, rasterizer 455, and raster operations unit 465.

Data assembler 412 processing unit collects vertex data for high-order surfaces, primitives, and the like, and outputs the vertex data to vertex processing unit 414. Vertex processing unit 414 is a programmable execution unit that is configured to execute vertex shader programs, computing vertex data using the patch data, and transforming vertex data as specified by the vertex shader programs. For example, vertex processing unit 414 may be programmed to transform the vertex data from an object-based coordinate representation (object space) to an alternatively based coordinate system such as world space or normalized device coordinates (NDC) space. Vertex processing unit 414 may read data that is stored in parameter memory 308, PP memory 204, or system memory 104 for use in processing the vertex data.

Patch assembly unit 416 receives the vertex data and produces patch data tessellation control unit 420 computes tessellation level of detail (LOD) values for the patches. Tessellation control unit 420 may include task generator 200 to divide the patches into tasks. Task generator 200 receives a stream of patches and outputs a stream of tasks. Vertex stitching unit 425 receives tasks representing portions of high-order surfaces, primitives, and the like, performs vertex stitching and outputs ordered lists of vertices (or vertex indices that are used to access a vertex cache or parameter memory 308) that define graphics primitive topologies to tesselation evaluator 430. Graphics primitives include triangles, line segments, points, and the like. Tessellation evaluator 430 evaluates the vertex parameters for each vertex to produce per-vertex attributes, such as position, color, texture coordinates, and the like.

Primitive assembler 446 receives vertex attributes from tesselation evaluator 430 and constructs the graphics primitives for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. In some embodiments of the present invention, geometry processing unit 448 may also add or delete elements in the geometry stream. Geometry processing unit 448 outputs the parameters and vertices specifying new graphics primitives to rasterizer 455 or to memory interface 214. Geometry processing unit 448 may read data that is stored in PP memory 204 or system memory 104 for use in processing the geometry data.

Rasterizer 455 scan converts the new graphics primitives and outputs fragments and coverage data to fragment processing unit 460. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 or system memory 104 for use in processing the fragment data. Fragments may be shaded at pixel, sample, or other granularity, depending on the programmed sampling rate.

Memory interface 214 produces read requests for data stored in graphics memory and performs texture filtering operations, e.g., bilinear, trilinear, anisotropic, and the like. In some embodiments of the present invention, memory interface 214 may be configured to decompress data. In particular, memory interface 214 may be configured to decompress fixed length block encoded data, such as compressed data represented in a DXT format. Raster operations unit 465 is a processing unit that performs raster operations, such as stencil, z test, and the like, and outputs pixel data as processed graphics data for storage in graphics memory. The processed graphics data may be stored in graphics memory, e.g., PP memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Task Generation

Figure 5A:
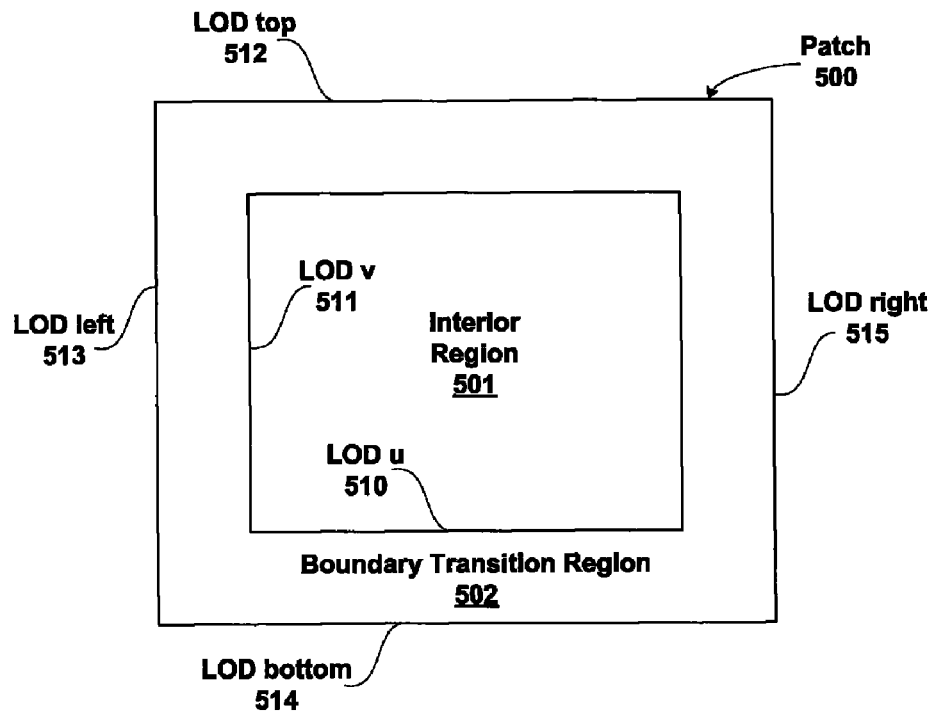
FIG. 5A illustrates an interior region and a transition region of a rectangular patch in accordance with one or more aspects of the present invention.

Surfaces constructed of three-dimensional patches, such as Bezier patches, NURBS (non-uniform rational b-splines), and subdivision surfaces are tessellated to form graphics primitives. Patches are broken up into tasks, where each task is one of an entire patch, part of an interior region of the patch, or part of a boundary transition region of the patch. FIG. 5A illustrates an interior region 501 and a boundary transition region 502 of a patch 500, in accordance with one or more aspects of the present invention. Interior region 501 has a tessellation LOD associated with each edge, LODu 510 and LODv 511. LODu 510 and LODv 511 are also LODs of boundary transition region 502, in addition to four LODs that are associated with each edge of patch 500, specifically, LOD top 512, LOD left 513, LOD bottom 514, and LOD right 515. Boundary transition region 502 can be broken into separate sections that are each associated with an edge of patch 500 and include a one primitive wide band around the perimeter of interior region 501.

Figure 5B:
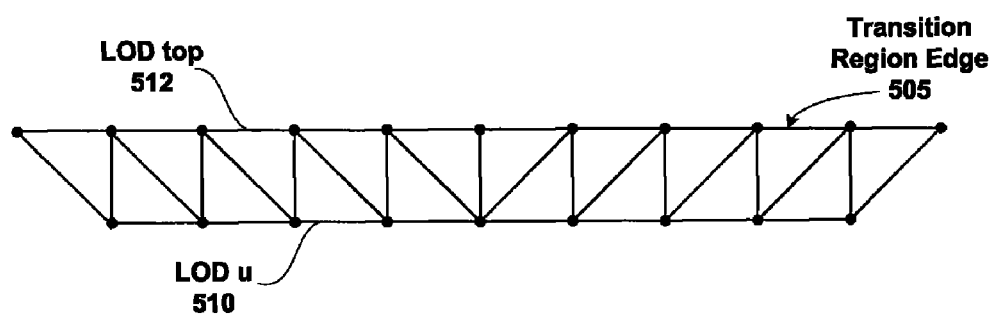
FIG. 5B illustrates a transition region edge in accordance with one or more aspects of the present invention.

FIG. 5B illustrates a section of boundary transition region 502, a transition region edge 505, in accordance with one or more aspects of the present invention. The tessellation LOD associated with each edge of transition region edge 505 determines the number of segments along each edge. The number of segments corresponding to LOD top 512 is equal to LOD top 512 (ten as shown in FIG. 5B). The number of segments corresponding to LOD u 510 is equal to LODu 510−2 (eight when LODu 510 is ten, as shown in FIG. 5B). Similarly, interior region 501 is tessellated according to the tessellation LODs associated with interior region 501. The tessellation LOD values on either side of transition region edge 505 may differ. Stitching should produce a set of non-intersecting graphics primitives (triangles) that completely cover transition region edge 505 and that include vertices that are common with a boundary transition region of any adjacent patch. Likewise, a task for a boundary transition region includes the vertices that are common with the boundary transition region of any adjacent patch. Including the common vertices for patch and task boundaries within each task allows each task to be processed independently.

TABLE 1 includes equations for computing the number of vertices (num_verts) and primitives (num_prims) of a quadrilateral patch. num_prims refers to the number of output triangle graphics primitives for the quadrilateral domain. When point graphics primitives are used, the number of primitives is simply equal to the number of vertices.

TABLE 1

Quadrilateral Domain num_verts = (lod_u − 1) * (lod_v − 1) + lod_left + lod_right + lod_bottom + lod_top
num_prims = 2 * (lod_u_i − 2) * (lod_v_i − 2) + lod_left + lod_right + lod_bottom + lod_top + 2 * (lod_u + lod_v) − 8

In addition to quadrilateral patches, such as patch 500, triangular patches may also be used. TABLE 2 includes equations for computing the number of vertices and primitives of a triangular patch. num_prims refers to the number of output triangle graphics primitives for the triangle domain. When point graphics primitives are used, the number of primitives is simply equal to the number of vertices. The program instructions are presented in C pseudo-code for ease of presentation.

TABLE 2

Triangle Domain num_verts = ceil((3/4) * (lod_u − 1) * (lod_u − 1)) + lod_left + lod_right + lod_bottom
num_prims = floor((3/2) * (lod_u − 2) * (lod_u − 2)) lod_left + lod_right + lod_bottom + 3 * lod_u − 6

TABLE 3 includes equations for computing the number of vertices and primitives of an isoline patch. Line segment graphics primitives define a quadrilateral isoline patch. num_prims refers to the number of output line segments for the isoline domain. Note that only two LODs are used for the isoline domain since there are no boundary transition regions. When point graphics primitives are used, the number of primitives is simply equal to the number of vertices.

TABLE 3

Figure 5C:
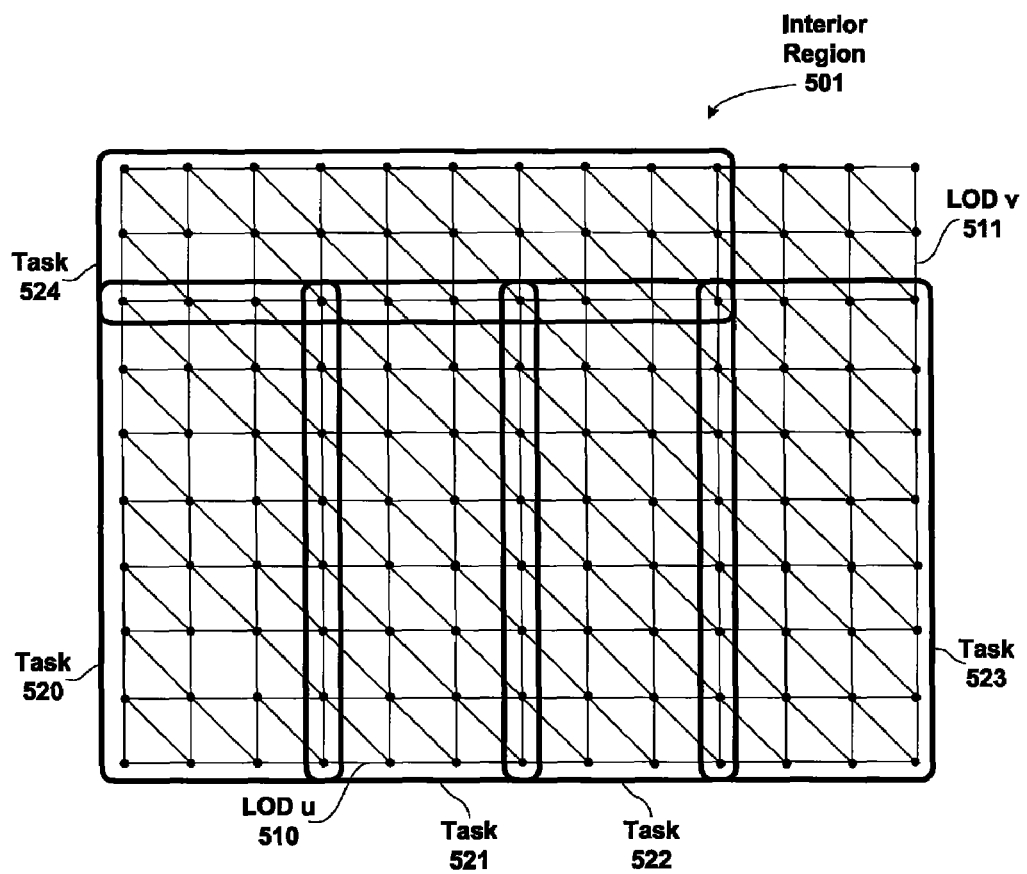
FIG. 5C illustrates an interior region divided into tasks in accordance with one or more aspects of the present invention.

Isoline Domain num_verts = (lod_bottom_i + 1) * lod_left_i
num_prims = lod_bottom_i * lod_left_i FIG. 5C illustrates interior region 501 divided into tasks, in accordance with one or more aspects of the present invention. As shown in FIG. 5C, LOD u 510 is fourteen and the number of vertices along the bottom edge of interior region 510 is thirteen. A task height is specified for a task that defines the maximum number of vertices for each task in the v direction. The maximum number of vertices in each task is also defined, and a value of 32 is used in reference to FIG. 5C. A task width of floor (maximum number of vertices/task height) is computed for the tasks. When the maximum number of vertices is 32 and the task height is 8, the task width is 4.

Four tasks, task 520, 521, 522, and 523 are generated to span the width of the first cut of interior region 501. A "cut" is a collection of horizontally-adjacent tasks. A step size of the task width−1 is used to step across the interior region 501 in the u direction. Vertices on the edges of the tasks are common to two tasks. Vertices on the corners of patches are common to up to four tasks. Vertices that are included in more than one task will be separately processed for each task. Although this processing may be redundant, including vertices at task boundaries in multiple tasks allows for processing of each task to be independent of the processing for other tasks. The tasks can therefore be distributed for processing in parallel, resulting in a performance improvement compared with using a single processing engine to process the entire patch. Task 524 uses a task height of 3 since only 3 vertices remain in the v direction. The task width is recomputed as 10 (floor 32/3), resulting in dimensions of 10 by 3 for task 524. The remaining vertices of interior region 501 are included in a sixth task with dimensions of 4 by 3.

Figure 6A:
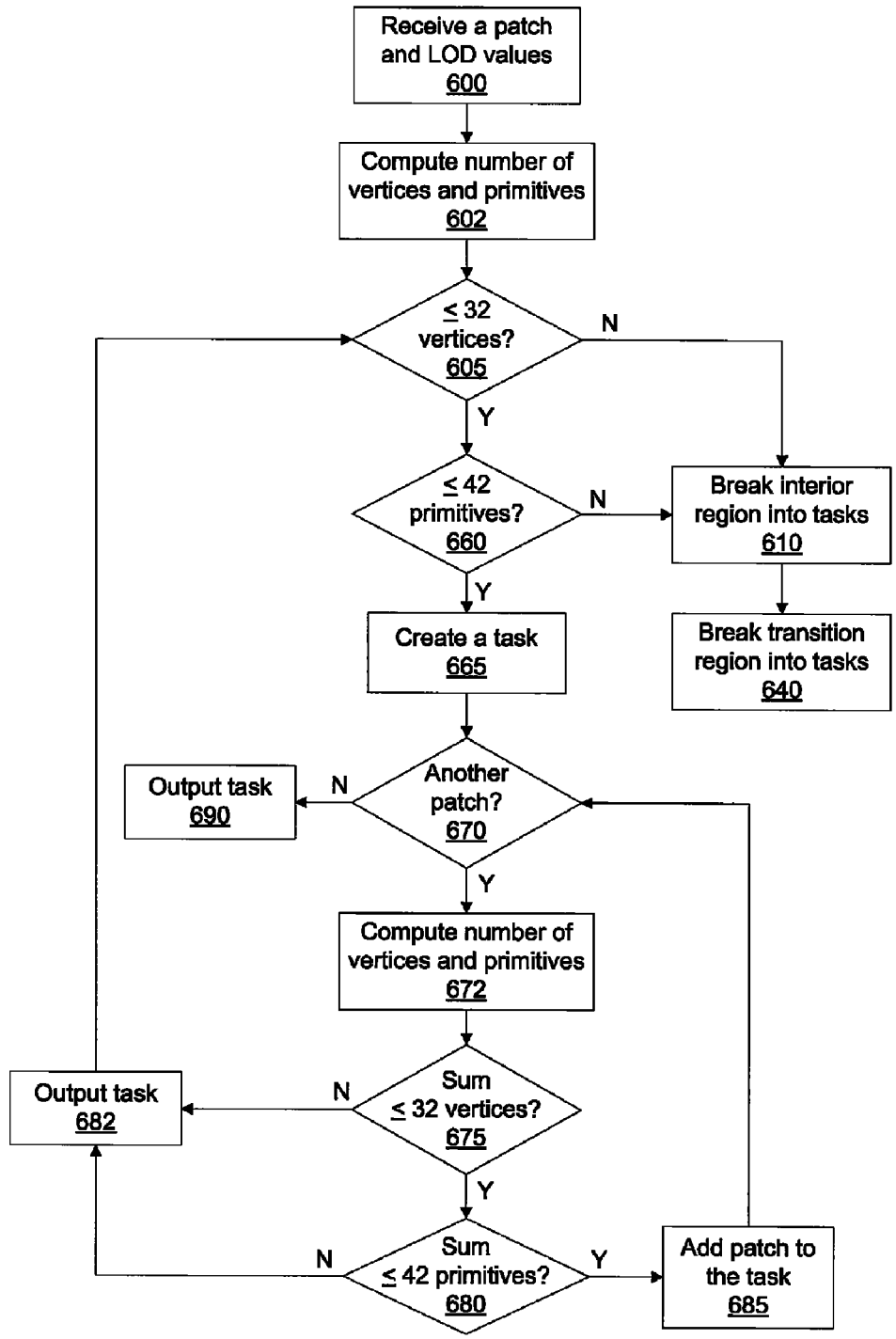
FIG. 6A is a flow diagram of method steps for dividing a patch into tasks in accordance with one or more aspects of the present invention.

FIG. 6A is a flow diagram of method steps for dividing a patch into tasks, in accordance with one or more aspects of the present invention. In step 600 task generator 200 receives a patch and LOD values. In step 602 task generator 200 computes the number of vertices and primitives for the patch using the LOD values. In some embodiments of the present invention the number of vertices and primitives is provided to task generator 200 as an input.

In step 605 task generator 200 determines if the number of vertices is less than or equal to a maximum number of vertices 32. In other embodiments of the present invention, a different maximum number of vertices may be specified. If the number of vertices is greater than 32, then in step 610 task generator 200 breaks the interior region of the patch into one or more tasks, as described in conjunction with FIG. 6B. In step 640 task generator 200 breaks the transition region into one or more tasks, as described in conjunction with FIG. 6C.

If, in step 605, task generator 200 determines that the number of vertices in the patch is less than or equal to 32, then in step 660 task generator 200 determines if the number of primitives is less than or equal to 42. In some embodiments of the present invention, 42 is the maximum number of triangle primitives that are supported and therefore, the number of triangle primitives defined by 32 vertices is limited to 42.

Other embodiments of the present invention may support more or less than 42 triangle primitives. When point graphics primitives are used, the maximum number of primitives is 32. When line segment graphics primitive are used, the maximum number of primitives is 31 (with a task height of 1). If the number of primitives is greater than 42, then task generator 200 completes steps 610 and 640 to break the patch into tasks. Otherwise, in step 665, task generator 200 creates a new task that includes the entire patch. In step 670 task generator 200 determines if another patch is ready for processing, and, if not, in step 690 the new task is output. If another patch is available, then in step 672 task generator 200 computes the number of vertices and primitives for the new patch. In step 675 task generator 200 determines if the sum of the number of vertices for the first patch and the second patch is less than or equal to 32. When the sum exceeds 32, task generator 200 proceeds to step 682 and outputs the new task including only the first patch. Task generator 200 then returns to step 605 to process the second patch. In some embodiments of the present invention, each task includes no more than one patch.

If, in step 675 task generator determines that the sum is less than or equal to 32, then in step 680 task generator determines if the sum of the number of primitives for the first patch and the second patch is less than or equal to 42, and, if not, task generator proceeds to step 682. Otherwise, in step 685 task generator 200 adds the second patch to the task that was created in step 665. In step 690 task generator returns to step 670.

Figure 6B:
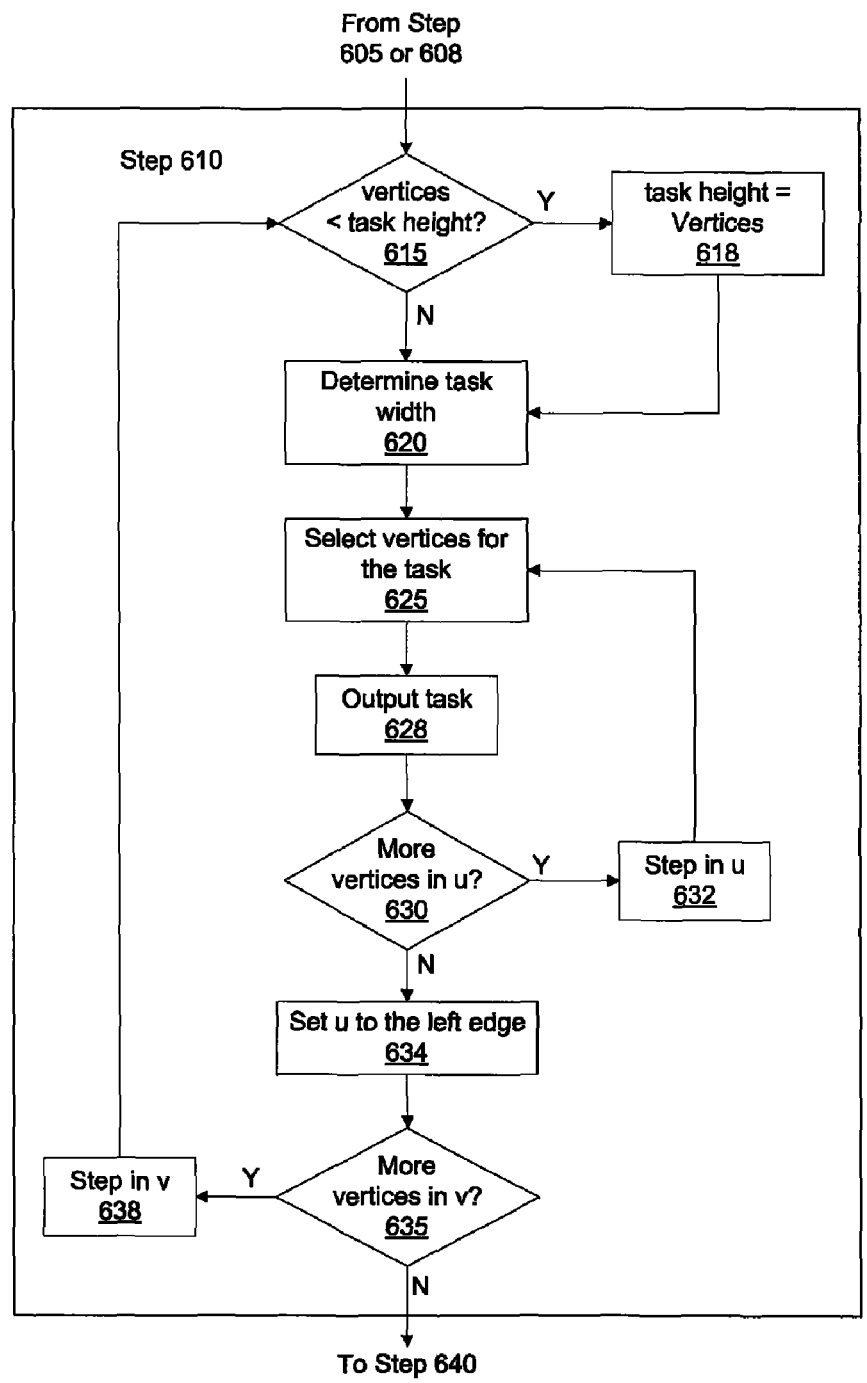
FIG. 6B is a flow diagram of method steps for performing a step shown in FIG. 6A in accordance with one or more aspects of the present invention.

FIG. 6B is a flow diagram of method steps for performing step 610 FIG. 6A to break the interior region of a patch into tasks, in accordance with one or more aspects of the present invention. In step 615 task generator 200 determines if the number of vertices in the v direction is less than the task height. When the number of vertices is less than the task height, in step 618 task generator 200 uses the number of vertices as the task height and proceeds to step 620. When the number of vertices is not less than the task height, task generator 200 determines the task width in step 620. As previously described, the task width is the integer portion of the maximum number of vertices divided by the task height. In step 625 task generator 200 selects the vertices for the task as a task width by task height set of vertices. When the number of vertices in the u direction is less than the task width, the remaining vertices in the u direction are selected for the task. In step 628 task generator outputs the task. In other embodiments of the present invention, the task width is specified and the task height is computed.

In step 630 task generator 200 determines if the patch includes more vertices in the u direction, and, if so, in step 632 task generator 200 steps in the u direction. Specifically, task generator 200 increments the u coordinate of a starting point for the next task by task width−1 when the graphics primitive is a triangle or line segment. When the graphics primitive is a point, each vertex is only included in one task, so the step size equals the task width. If, in step 630 task generator 200 determines that there are no more vertices in the u direction, then in step 634 task generator sets the u coordinate of the next task to zero (or the u value of the left edge of the patch).

In step 635 task generator 200 determines if there are more vertices in the v direction. If there are no more vertices in the v direction, then task generator 200 proceeds to step 640. Otherwise, in step 638 task generator 200 steps in the v direction and returns to step 615. Specifically, task generator 200 increments the v coordinate of a starting point for the next task by task height−1 when the graphics primitive is a triangle. When the graphics primitive is a point, each vertex is only included in one task, so the step size equals the task width. When the output primitive is line segments, v is incremented by task height and u is incremented by the task width−1. The u and v increments used in steps 632 and 638 for each primitive type are shown in TABLE 4.

TABLE 4

| primitive | u increment | v increment |
| --- | --- | --- |
| point | task width | task height |
| line segment | task width − 1 | task height |
| triangle | task width − 1 | task height − 1 |

Figure 6C:
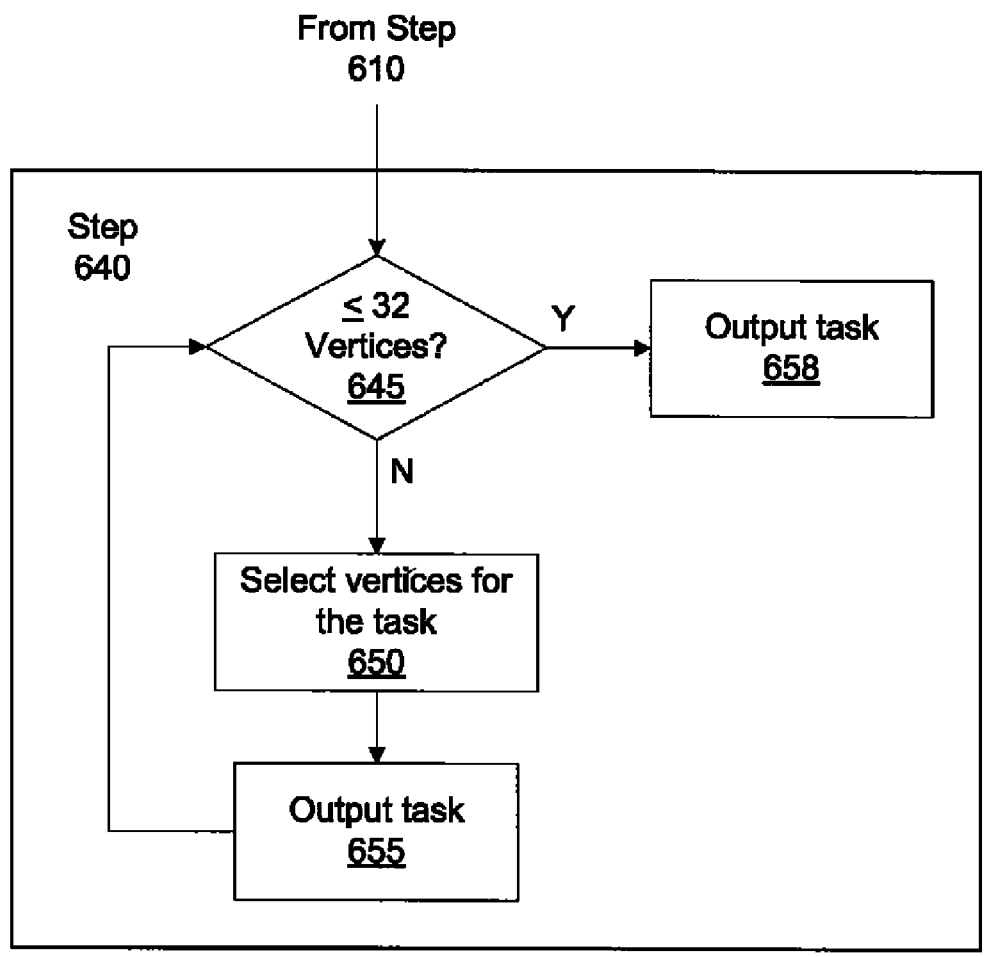
FIG. 6C is a flow diagram of method steps for performing another step shown in FIG. 6A in accordance with one or more aspects of the present invention.

FIG. 6C is a flow diagram of method steps for performing step 640 shown in FIG. 6A to break the boundary transition region of a patch into tasks, in accordance with one or more aspects of the present invention. In step 645 task generator 200 determines if there are less than 32 vertices in the boundary transition region, and, if so, in step 658 task generator 200 outputs the entire boundary transition region of the patch as a task. Otherwise, in step 650 task generator 200 selects vertices for the task. Since the boundary transition region is only a single graphics primitive in width, the task width and height are not used. Instead, the vertices forming the boundary transition region are counted off by stepping in u and v directions, until the maximum number of vertices is reached or all of the remaining vertices are included in the task. For each subsequent task after the first task of a patch, the last vertex of the previous task is included for the boundary transition region when the graphics primitive is a triangle or line segment. When the graphics primitive is a point, each vertex is only included in one task. In step 655 task generator 200 outputs the task. When the graphics primitive is a line segment the entire patch is processed as an interior region so there is no boundary transition region.

Figure 7A:
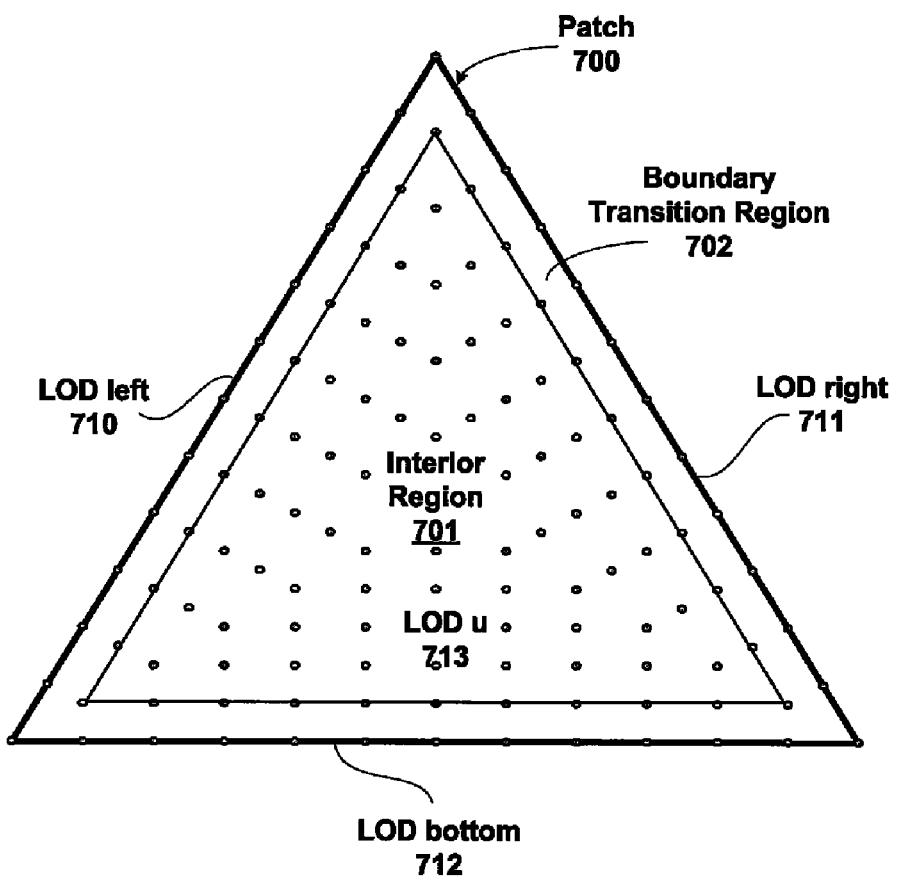
FIG. 7A illustrates an interior region and a transition region of a triangular patch in accordance with one or more aspects of the present invention.

FIG. 7A illustrates an interior region 701 and a boundary transition region 702 of a triangular patch 700, in accordance with one or more aspects of the present invention. Similar to the quadrilateral patch 500, boundary transition region 702 is one graphics primitive wide and there is an LOD for each edge of patch 700, e.g., LOD left 710, LOD right 711, and LOD bottom 712. There is also a single LOD for interior region 701, LOD u 713. Tasks for triangle patches are determined using the method described in conjunction with FIGS. 6A, 6B, and 6C.

Figure 7B:
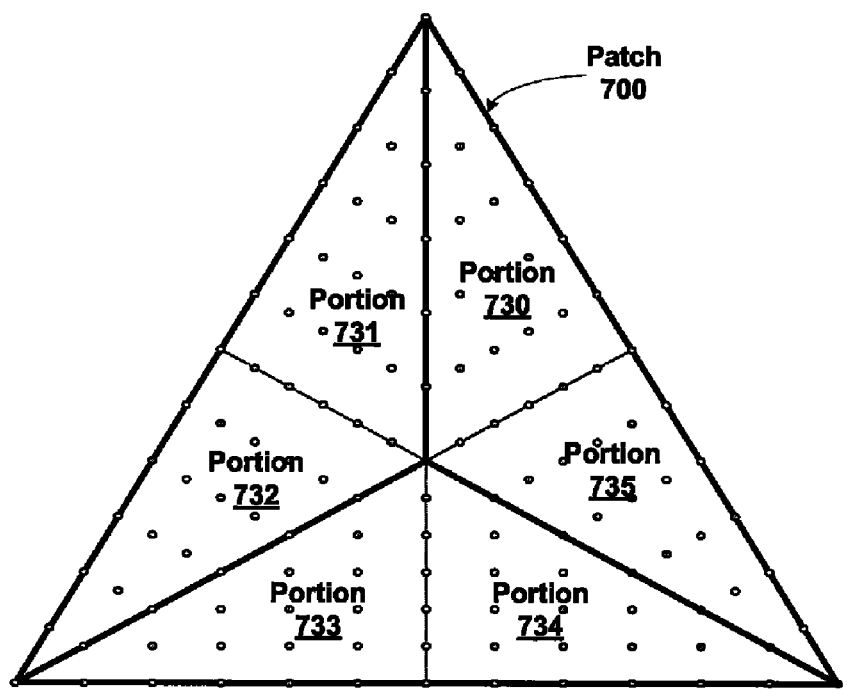
FIG. 7B illustrates portions of a triangular patch in accordance with one or more aspects of the present invention.
Figure 7C:
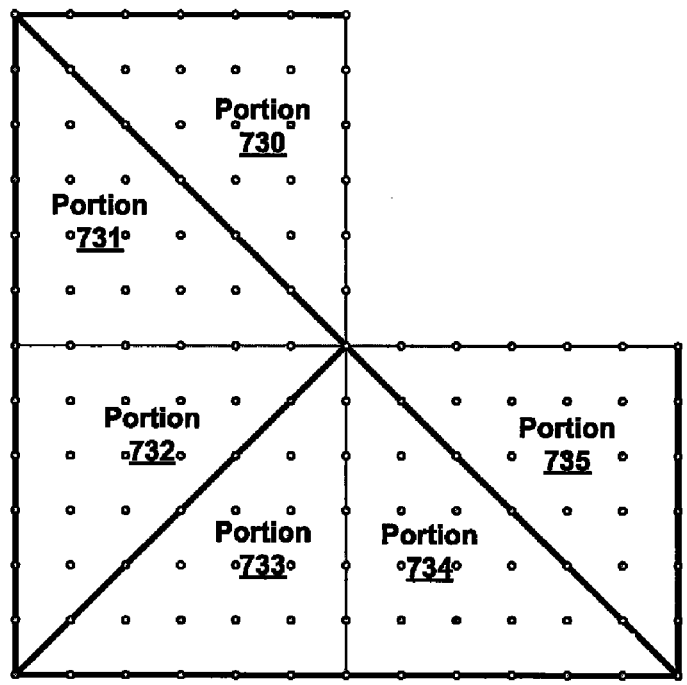
FIG. 7C illustrates the portions of the triangular patch converted into rectangular regions in accordance with one or more aspects of the present invention.

FIG. 7B illustrates portions of triangular patch 700, in accordance with one or more aspects of the present invention. There are two portions associated with each edge of triangular patch 700. Triangular patch 700 is broken into rectangular portions 730 and 735 and the resulting topology is shown in FIG. 7C. When the interior LOD is even, the sizes of the two interior regions (in vertices) are: LOD/2×LOD−1 and LOD/2×LOD/2. When the interior LOD is odd, the sizes of the two interior regions are: (LOD+1)/2×LOD−1 and (LOD−1)/2×(LOD−1)/2.

FIG. 7C illustrates portions 730, 731, 732, 733, 734, and 735 of triangular patch 700 when the topology is converted into two rectangular regions, in accordance with one or more aspects of the present invention. The first rectangular region includes portions 732, 733, 734, and 735. The second rectangular region includes portions 730 and 731. Interior region 701 within each rectangular region is traversed according to the method described in conjunction with FIGS. 6A and 6B to produce tasks for interior region 701.

Figure 8:
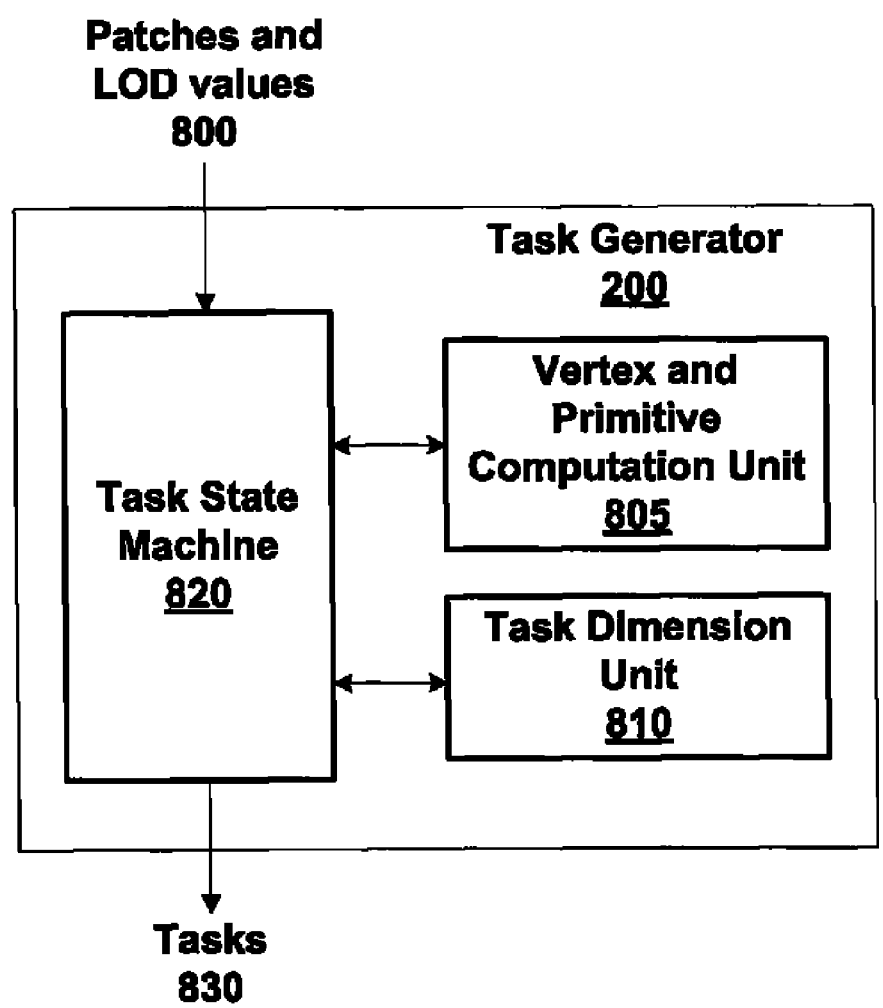
FIG. 8 is a block diagram of a task generator in accordance with one or more aspects of the present invention.

FIG. 8 is a block diagram of task generator 200, in accordance with one or more aspects of the present invention. Task generator 200 includes a task state machine 820, a vertex and primitive computation unit 805, and a task dimension unit 810. Task generator 200 receives patches and LOD values 800 and outputs tasks 830 that include a portion of a patch, a single patch, or multiple patches. Tasks 830 each include a number of vertices that is less than or equal to a specified maximum. Vertex and primitive computation unit 805 receives the LOD values for the patch and computes the number of vertices and primitives for the patch using the equations shown in TABLES 1, 2, and 3 to perform steps 602 and 672 of FIG. 6A. Task dimension unit 810 stores the specified task height and specified maximum number of vertices for a task and computes the task width to perform step 620 of FIG. 6B. Task state machine 820 performs the method described in conjunction with FIGS. 6A, 6B, and 6C to produce tasks 830.

Dividing the processing workload for each patch into approximately equal tasks 830 enables distribution of the vertex evaluation processing for the patches to multiple cores 208. Processing of the tasks can be performed in parallel using an array of cores 208. In addition to enabling the distribution of the vertex processing workload, dividing the patch into tasks that are limited in size, allows the amount of buffering needed to store tasks 830 or vertex attributes that are output as a result of processing tasks 830 to be limited. Reducing the amount of buffering circuitry is beneficial in terms of die size.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for dividing three-dimensional patches into tasks for processing, the method comprising:
receiving control points defining a three dimensional patch;
determining if a number of vertices of the three dimensional patch is greater than a maximum value;
outputting the three dimensional patch as a single task when the number of vertices is not greater than the maximum value; and
breaking the three dimensional patch into multiple tasks that each include a number of vertices that is not greater than the maximum value when the number of vertices is greater than the maximum value and outputting the multiple tasks.

2. The method of claim 1, further comprising the steps of:
receiving tessellation level of detail (LOD) values for the three dimensional patch; and
computing the number of vertices of the three dimensional patch using the tessellation LOD values.

3. The method of claim 2, further comprising the steps of:
computing a number of graphics primitives of the three dimensional patch using the tessellation LOD values; and
breaking the three dimensional patch into the multiple tasks when the number of graphics primitives is greater than a maximum number of graphics primitives.

4. The method of claim 1, wherein the maximum value equals a number of processing cores that are configured to process the multiple tasks.

5. The method of claim 1, further comprising the steps of:
receiving control points defining an additional three dimensional patch; and
combining the additional three dimensional patch with the patch when a sum of the number of vertices in the three dimensional patch and the additional three dimensional patch is not greater than the maximum value to produce the single task.

6. The method of claim 1, further comprising the step of processing the single task or the multiple tasks by evaluating vertex attributes to produce vertex positions for the three dimensional patch.

7. The method of claim 1, wherein the step of breaking the three dimensional patch into the multiple tasks comprises selecting vertices included in an interior region of the three dimensional patch using a task height and task width.

8. The method of claim 1, wherein the step of breaking the three dimensional patch into the multiple tasks comprises selecting vertices included in a boundary transition region of the three dimensional patch, wherein the boundary transition region is a perimeter region of the three dimensional patch that is one graphics primitive wide.

9. The method of claim 1, wherein vertices of the three dimensional patch at a task edge are included in each task that shares the task edge when triangular or line segment graphics primitives are produced to tessellate the three dimensional patch.

10. The method of claim 1, wherein the three dimensional patch is triangular and further comprising the step of dividing the three dimensional patch to produce two quadrilateral regions that represent the three dimensional patch.

11. A non-transitory computer readable medium storing instructions for causing a processor to divide three-dimensional patches into tasks for processing by performing the steps of:
receiving control points defining a three dimensional patch;
determining if a number of vertices of the three dimensional patch is greater than a maximum value;
outputting the three dimensional patch as a single task when the number of vertices is not greater than the maximum value; and
breaking the three dimensional patch into multiple tasks that each include a number of vertices that is not greater than the maximum value when the number of vertices is greater than the maximum value and outputting the multiple tasks.

12. A system for dividing three-dimensional patches into tasks for processing, the system comprising:
a task generator configured to:
receive control points defining a three dimensional patch;
determine if a number of vertices of the three dimensional patch is greater than a maximum value;
output the three dimensional patch as a single task when the number of vertices is not greater than the maximum value; and break the three dimensional patch into multiple tasks that each include a number of vertices that is not greater than the maximum value when the number of vertices is greater than the maximum value and output the multiple tasks.

13. The system of claim 12, wherein the task generator is further configured to receive tessellation level of detail (LOD) values for the three dimensional patch and compute the number of vertices of the three dimensional patch using the tessellation LOD values.

14. The system of claim 13, wherein the task generator is further configured to compute a number of graphics primitives of the three dimensional patch using the tessellation LOD values and break the three dimensional patch into the multiple tasks when the number of graphics primitives is greater than a maximum number of graphics primitives.

15. The system of claim 12, further a number of processing cores configured to process the multiple tasks in parallel by evaluating vertex attributes to produce vertex positions for the three dimensional patch, wherein the number of processing cores equals the maximum value.

16. The system of claim 12, wherein the task generator is further configured to
receive control points defining an additional three dimensional patch and
combine the additional three dimensional patch with the patch when a sum of the number of vertices in the three dimensional patch and the additional three dimensional patch is not greater than the maximum value to produce the single task.

17. The system of claim 12, wherein the task generator is further configured to break the three dimensional patch into the multiple tasks by selecting vertices included in an interior region of the three dimensional patch using a task height and task width.

18. The system of claim 12, wherein the task generator is further configured to select vertices included in a boundary transition region of the three dimensional patch, the boundary transition region being a perimeter region of the three dimensional patch that is one graphics primitive wide.

19. The system of claim 12, wherein the task generator is further configured to include vertices of the three dimensional patch that are at a task edge in each task that shares the task edge when triangular or line segment graphics primitives are produced to tessellate the three dimensional patch.

20. The system of claim 12, wherein the task generator is further configured to divide the three dimensional patch to produce two quadrilateral regions representing the three dimensional patch when the three dimensional patch is triangular.

* * * * *